(12) United States Patent  
Chapman et al.

(10) Patent No.: US 8,797,602 B2  
(45) Date of Patent: Aug. 5, 2014

(54) UV AND IR SPECIALTY IMAGING METHODS AND SYSTEMS

(75) Inventors: Edward Chapman, Rochester, NY (US); Jonathan Ross Ireland, Lancaster, PA (US); Reiner Eschbach, Webster, NY (US); William A. Fuss, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 496 days.

(21) Appl. No.: 13/069,878

(22) Filed: Mar. 23, 2011

(65) Prior Publication Data  
US 2012/0243009 A1 Sep. 27, 2012

(51) Int. Cl.  
*H04N 1/40* (2006.01)

(52) U.S. Cl.  
USPC .......... 358/3.28; 358/1.9; 358/2.1; 358/1.13; 358/1.18; 358/539; 382/165; 382/180

(58) Field of Classification Search  
USPC .............. 358/1.9, 2.1, 3.02, 3.06, 3.23, 3.28, 358/1.13, 1.18, 539; 382/165, 180  
See application file for complete search history.

(56) References Cited

U.S. PATENT DOCUMENTS

| 5,286,286 | A | 2/1994 | Winnik et al. |
| 5,734,752 | A | 3/1998 | Knox |
| 7,614,558 | B2 | 11/2009 | Katsurabayashi |
| 2003/0095271 | A1* | 5/2003 | Falk ............................... 358/1.9 |
| 2008/0297851 | A1* | 12/2008 | Bala et al. .................... 358/3.28 |
| 2008/0299333 | A1 | 12/2008 | Bala et al. |
| 2008/0302263 | A1 | 12/2008 | Eschbach et al. |
| 2008/0304696 | A1 | 12/2008 | Eschbach et al. |
| 2009/0262400 | A1* | 10/2009 | Eschbach et al. ............ 358/3.28 |
| 2009/0317595 | A1* | 12/2009 | Brehm et al. ................. 428/172 |
| 2010/0214595 | A1 | 8/2010 | Chapman et al. |
| 2010/0245928 | A1* | 9/2010 | Zhao et al. .................... 358/3.28 |

OTHER PUBLICATIONS

U.S. Appl. No. 12/627,163, filed Nov. 30, 2009, Zhao et al.  
U.S. Appl. NO. 12/957,590, filed Dec. 1, 2010, Maltz et al.

* cited by examiner

*Primary Examiner* — King Poon  
*Assistant Examiner* — Jamares Q Washington  
(74) *Attorney, Agent, or Firm* — Fay Sharpe LLP

(57) ABSTRACT

Disclosed are methods and systems of processing work flow associated with a print job including Specialty Imaging such as UV and/or IR encoding. According to one exemplary embodiment, a printing system controller accesses a spatially structured ink composed of a plurality of non-overlapping primitive spot colors to render Specialty Imaging effects along with other images and text associated with the print job.

21 Claims, 5 Drawing Sheets

UV AND IR SPECIALTY IMAGING METHODS AND SYSTEMS

CROSS REFERENCE TO RELATED PATENTS AND APPLICATIONS

U.S. patent application Ser. No. 11/754,702, filed May 29, 2007, entitled "SUBSTRATE FLUORESCENT NON-OVERLAPPING DOT PATTERNS FOR EMBEDDING INFORMATION IN PRINTED DOCUMENTS," by Bala et al.; U.S. patent application Ser. No. 11/758,344, filed Jun. 5, 2007, entitled "INFRARED ENCODING OF SECURITY ELEMENTS USING STANDARD XEROGRAPHIC MATERIALS," by Eschbach et al.; and U.S. patent application Ser. No. 12/627,163, filed Nov. 30, 2009, entitled "PHASE LOCKED IR ENCODING FOR PEENED 2D BARCODES," by Zhao et al. are incorporated herein by reference in their entirety.

BACKGROUND

It is desirable to have a way to provide for the detection of counterfeiting, illegal alteration, and/or copying of a document, most desirably in a manner that will provide document security and which is also applicable for digitally generated documents. It is desirable that such a solution also have minimum impact on system overhead requirements as well as minimal storage requirements in a digital processing and printing environment. Additionally, it is particularly desirable that this solution be obtained without physical modification to the printing device and without the need for costly special materials and media.

Watermarking is a common way to ensure security in digital documents. Many watermarking approaches exist with different trade-offs in cost, fragility, robustness, etc. One prior art approach is to use special ink rendering where the inks are invisible under standard illumination. These inks normally respond to light outside the visible range and thereby may be made visible. Examples of such extra-spectral techniques are UV (ultra-violet) and IR (infrared). This traditional approach is to render the encoded data with special inks that are not visible under normal light, but have strong distinguishing characteristics under the special spectral illumination. Determination of the presence or absence of such encoding may be thereby subsequently performed using an appropriate light source and detector. One example of this approach is found in U.S. Patent Application No. 2007/0017990 to Katsurabayashi et al., which is herein incorporated by reference in its entirety for its teachings. However, these special inks and materials are often difficult to incorporate into standard electro-photographic or other non-impact printing systems like solid ink printers, either due to cost, availability or physical/chemical properties. This in turn discourages their use in variable data printing arrangements, such as for redeemable coupons or other personalized printed media for example.

Another approach is to use ultra-violet (UV) ink rendering, to encode a watermark that is not visible under normal illumination, but revealed under UV illumination. The traditional approach, often used in currency notes, is to render a watermark with special ultra-violet (UV) fluorescent inks and to subsequently identify the presence or absence of the watermark in a proffered document using a standard UV lamp. One example of this approach may be found in U.S. Pat. No. 5,286,286 to Winnik et al., which is herein incorporated by reference in its entirety for its teachings. However, these inks are costly to employ, and thus are typically only economically viable in offset printing scenarios, and thus only truly avail themselves of long print runs. Additionally, these materials are often difficult to incorporate into standard electro-photographic or other non-impact printing systems like solid ink printers, either due to cost, availability or physical/chemical properties. This in turn discourages their use in variable data printing arrangements, such as for redeemable coupons, for but one example.

Another approach taken to provide a document for which copy control is provided by digital watermarking includes as an example U.S. Pat. No. 5,734,752 to Knox, where there is illustrated a method for generating watermarks in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

INCORPORATION BY REFERENCE

U.S. patent application Ser. No. 12/957,590, filed Dec. 1, 2010, entitled "METHOD OF CREATING NON-PATTERNED SECURITY ELEMENTS," by Maltz et al.;

U.S. Patent Application Publication No. 2007/0017990, published Jan. 25, 2007, entitled "DOCUMENT CORRECTION DETECTION SYSTEM AND DOCUMENT TAMPERING PREVENTION SYSTEM," by Katsurabayashi;

U.S. Pat. No. 7,852,515, issued Dec. 14, 2010, entitled "INFRARED ENCODING FOR EMBEDDING MULTIPLE VARIABLE DATA INFORMATION COLLOCATED IN PRINTED DOCUMENTS," by Eschbach et al., U.S. Patent Application Publication No. 2009/0262400, published Oct. 22, 2009, entitled "INFRARED WATERMARKING OF PHOTOGRAPHIC IMAGES BY MATCHED DIFFERENTIAL BLACK STRATEGIES," by Eschbach et al.

U.S. Patent Application Publication No. 2010/0214595, published Aug. 26, 2010, entitled "METHOD AND APPARATUS FOR USING PATTERN COLOR SPACE IN PRINT JOB PROCESSING," by Chapman et al.;

U.S. Pat. No. 5,286,286, issued Feb. 15, 1994, entitled "COLORLESS FAST-DRYING INK COMPOSITIONS FOR PRINTING CONCEALED IMAGES DETECTABLE BY FLUORESCENCE," by Winnik et al.;

U.S. Pat. No. 7,800,785, issued Sep. 21, 2010, entitled "METHODOLOGY FOR SUBSTRATE FLUORESCENT NON-OVERLAPPING DOT DESIGN PATTERNS FOR EMBEDDING INFORMATION IN PRINTED DOCUMENTS," by Bala et al.; and U.S. patent application Ser. No. 12/627,163, filed Nov. 30, 1990, entitled "PHASE LOCKED IR ENCODING FOR PEENED 2D BARCODES," by Zhao et al. are incorporated herein by reference in their entirety.

BRIEF DESCRIPTION

In one embodiment of this disclosure, described is a method of processing a printing system work flow associated with a print job and printing the print job on a substrate using a printer operatively connected to the work flow, the work flow including one or more of a UV and IR embedded image, the method comprising a) accessing a document description including one or more device independent color space representations of the print job, the print job including one or more UV and IR embedded field to be rendered in a metameric process; b) transforming the one or more device independent color space representations of the print job to a device dependent color space representation of the print job; c) accessing a spatially structured pattern ink representing one or more of the UV and IR embedded fields to be included in the print job, the spatially structured pattern ink including a plurality of non-overlapping primitive spot colors retrieved from a primitive spot color database transforming a respective primitive spot color to a device dependent colorant recipe necessary to render the primitive spot color on the substrate using the printer; d) printing on the substrate the device dependent color space representation of the print job and the spatially structured pattern ink representing one or more of a UV and IR embedded image, wherein the printing of the device dependent color space representation on the substrate includes one or more halftone processes, and the printing of the spatially structured pattern ink on the substrate substantially includes the minimization of the effect of the one or more halftone processes on the printing of the spatially structured pattern ink.

In another embodiment of this disclosure, described is a printing system comprising a printer configured to receive device independent data representative of a print job including the device independent description of one or more data fields intended to be rendered using a UV and/or IR security field and print the device dependent data representation on a substrate, and a controller operatively connected to the printer, the controller configured to execute controller readable instructions to perform a method of processing a printing system work flow associated with a print job and printing the print job on the printer, the work flow including one or more of a UV and IR embedded image, the method comprising a) accessing a document description including one or more device independent color space representations of the print job, the print job including one or more UV and IR embedded fields to be rendered in a metameric process; b) transforming the one or more device independent color space representations of the print job to a device dependent color space representation of the print job; c) accessing a spatially structured pattern ink representing one or more of the UV and IR embedded fields to be included in the print job, the spatially structured pattern ink including a plurality of non-overlapping primitive spot colors retrieved from a primitive spot color database transforming a respective primitive spot color to a device dependent colorant recipe necessary to render the primitive spot color on the substrate using the printer; d) printing on the substrate the device dependent color space representation of the print job and the spatially structured pattern ink representing one or more of a UV and IR embedded image, wherein the printing of the device dependent color space representation on the substrate includes one or more halftone processes, and the printing of the spatially structured pattern ink on the substrate substantially includes the minimization of the effect of the one or more halftone processes on the printing of the spatially structured pattern ink.

In still another embodiment of this disclosure, described is a computer program product storing computer readable instructions, that when executed by a printing system controller, cause the printing system controller to execute a method of processing a printing system work flow associated with a print job and printing the print job on a substrate using a printer operatively connected to the work flow, the work flow including one or more of a UV and IR embedded image, the method comprising a) accessing a document description including one or more device independent color space representations of the print job, the print job including one or more UV and IR embedded fields to be rendered in a metameric process; b) transforming the one or more device independent color space representation of the print job to a device dependent color space representation of the print job; c) accessing a spatially structured pattern ink representing one or more of the UV and IR embedded fields to be included in the print job, the spatially structured pattern ink including a plurality of non-overlapping primitive spot colors retrieved from a primitive spot color database transforming a respective primitive spot color to a device dependent colorant recipe necessary to render the primitive spot color on the substrate using the printer; d) printing on the substrate the device dependent color space representation of the print job and the spatially structured pattern ink representing one or more of a UV and IR embedded image, wherein the printing of the device dependent color space representation on the substrate includes one or more halftone processes, and the printing of the spatially structured pattern ink on the substrate substantially includes the minimization of the effect of the one or more halftone processes on the printing of the spatially structured pattern ink.

DETAILED DESCRIPTION

Figure 1:
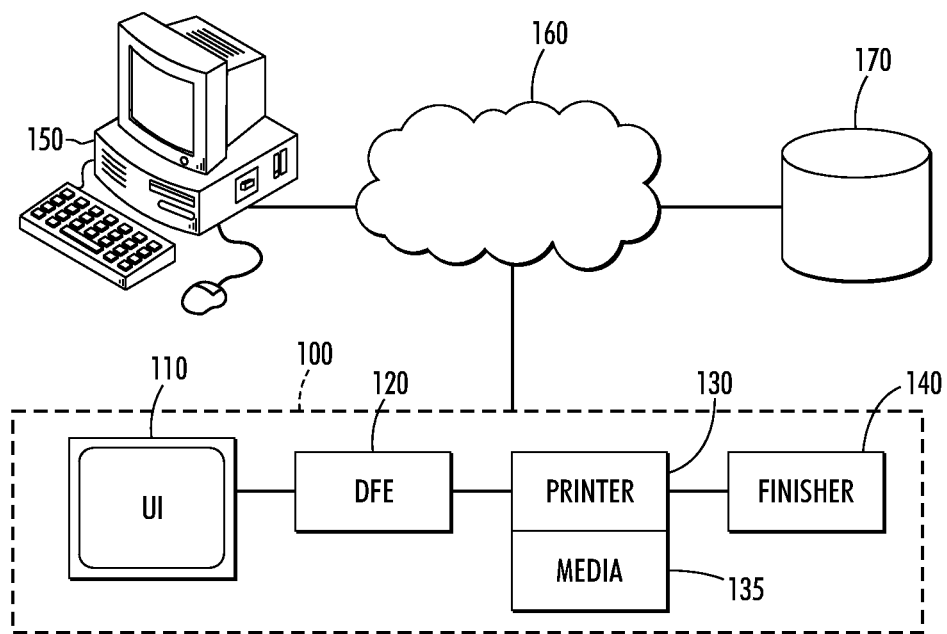
FIG. 1 is block diagram of a printing system suitable for implementing one or more aspects of the exemplary method described herein.

For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as a pattern of physical light or a collection of data representing said physical light, may include characters, words, and text as well as other features such as graphics. A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably. In the event that one term or the other is deemed to be narrower or broader than the other, the teaching as provided herein and claimed below is directed to the more broadly determined definitional term, unless that term is otherwise specifically limited within the claim itself.

The term "document" refers to a page or set of pages containing text, images, graphics and other printed element. The term "field" refers to an element of the document. The terms "data field" or "variable field" refer to a field whose content might change in distinct renderings of the base document. A "protected field" or "watermarked field" refers to a field that additionally exhibits security features in the form of one or multiple of watermark technologies.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation performs "image processing" when it operates on an item of data that relates to part of an image. "Contrast" is used to denote the visual difference between items, data points, and the like. It can be measured as a color difference or as a luminance difference or both. A digital color printing system is an apparatus arrangement suited to accepting image data and rendering that image data upon a substrate.

In a document, "color" refers to the visual experience of the user, or the equivalent data obtained from a camera of the like. "Device independent" refers to a color described in a generally understood way, for example through colorimetric values such as L*a*b*, XYZ, etc. or through idealized devices such as RGB or SWOP CMYK, GRACoL CMYK, Fogra CMYK, or the like. "Device dependent" refers to a color described in a machine specific way that is not generally transferrable to other devices, such as DeviceCMYK, or DeviceCMYKOG which are the actual physical signals to control the printing step.

For the purposes of clarity for what follows, the following additional term definitions are herein provided:

Colorant: A dye, pigment, ink, or other agent used to impart a color to a material. Colorants, such as most colored toners, impart color by altering the spectral power distribution of the light they receive from the incident illumination through two primary physical phenomenon: absorption and scattering. Color is produced by spectrally selective absorption and scattering of the incident light, while allowing for transmission/reflection of the remaining light. For example, cyan, magenta and yellow colorants selectively absorb long, medium, and short wavelengths respectively in the spectral regions. Some colorants, such as most colored toners, impart color via a dye operable in transmissive mode. Other suitable colorants may operate in a reflective mode. Some colorants are dye-based, other colorants are pigment-based. For the purposes of discussion in this specification but not to be limited to same, colorant will be taken to be one of the fundamental subtractive C, M, Y, K, primaries, (cyan, magenta, yellow, and black)-which may be realized in formulation as, liquid ink, solid ink, dye, or electrostatographic toner. Other common colorants are O (orange), G(green), etc. or variations of CMYK like lightC (light cyan), lightM (light magenta) etc.

Colorant mixture: a particular combination of C, M, Y, K colorants.

Metamer of metameric match: two or more physically distinct colorant mixtures that yield the same visual or perceptual impression. In real world scenarios, this matching visual impression will always be approximate and it is only important to create a match within the useful boundaries of the application. Colorimetric differences as well as differences created by distracting colors, etc., are, for the purpose of this application, assumed to be known and are described, for example in above cited U.S. Pat. No. 7,852,515. In the context of this application it is also understood that the term colorant refers to a visual attribute and thus excludes infrared or fluorescent material that is otherwise invisible to the human eye, as it is the common approach in traditional IR and fluorescent encoding.

With reference now to FIG. 1, a printing system or image rendering system 100 suitable for implementing aspects of the exemplary embodiments described herein is illustrated. The word "printer" and the term "printing system" as used herein encompass any apparatus and/or system, such as a digital copier, xerographic and reprographic printing systems, bookmaking machine, facsimile machine, multi-function machine, ink-jet machine, continuous feed, sheet-fed printing device, etc. which may contain a print controller and a print engine and which may perform a print outputting function for any purpose.

The printing system 100 generally includes a user interface 110, a digital front end (DFE) controller 120, and at least one print engine 130. The print engine 130 has access to print media 135 of various sizes, properties and cost for a print job. A "print job" or "document" is normally a set of related sheets, usually one or more collated copy sets copied from a set of original print job sheets or electronic document page images, from a particular user, or otherwise related. For submission of a regular print job, digital data is generally sent to the printing system 100. An optional finisher 140 operates after a job is printed by the print engine 130 to manage arrangement of the hard copy output, including sorting and/or cutting functions. A user can access and operate the printing system 100 using the user interface 110 or via a workstation 150. The workstation 150 communicates with the printing system 100 via a communications network 160. A user profile, a work product for printing, a media library, and various print job parameters can be stored in a database or memory 170 accessible by the workstation 150 or the printing system 100 via the network 160, or such data can be directly accessed via the printing system 100. One or more color sensors (not shown) may be embedded in the printer paper path, as known in the art.

Figure 2:
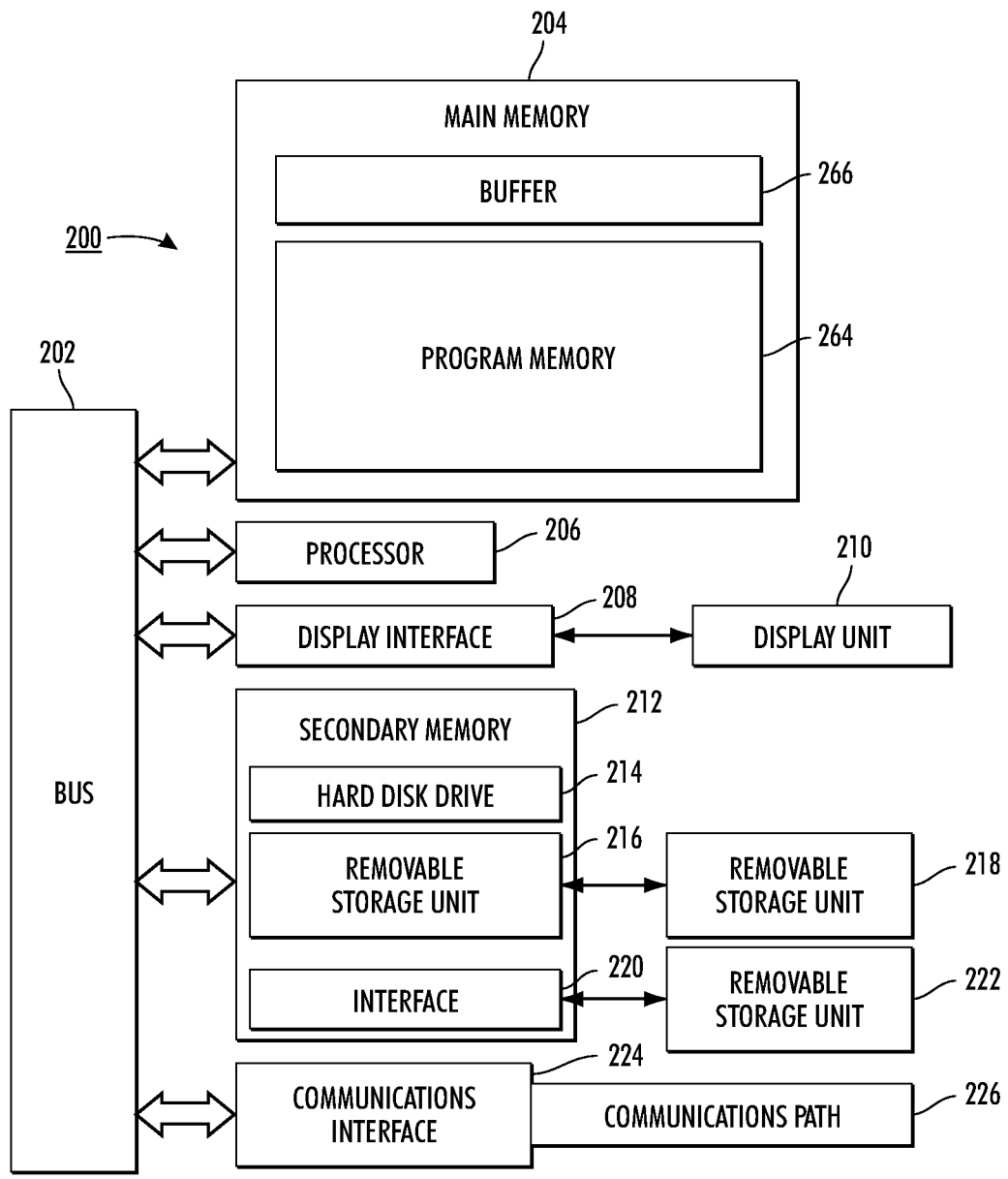
FIG. 2 is a block diagram of a DFE controller useful for implementing one or more aspects of the exemplary method described herein.

Turning now to FIG. 2, an exemplary DFE controller 200 is shown in greater detail. The DFE 200 includes one or more processors, such as processor 206 capable of executing machine executable program instructions. In the embodiment shown, the processor is in communication with a bus 202 (e.g., a backplane interface bus, cross-over bar, or data network). The DFE 200 also includes a main memory 204 that is used to store machine readable instructions. The main memory also being capable of storing data. Main memory may alternatively include random access memory (RAM) to support reprogramming and flexible data storage. Buffer 266 is used to temporarily store data for access by the processor. Program memory 264 includes, for example, executable programs that implement the embodiments of the methods described herein. The program memory 264 stores at least a subset of the data contained in the buffer.

The DFE 200 includes a display interface 208 that forwards data from communication bus 202 or from a frame buffer (not shown) to a display 210. The DFE 200 also includes a secondary memory 212 including, for example, a hard disk drive 214 and/or a removable storage drive 216, which reads and writes to removable storage 218, such as a floppy disk, magnetic tape, optical disk, etc., that stores computer software and/or data. The secondary memory 212 alternatively includes other similar mechanisms for allowing computer programs or other instructions to be loaded into the computer system. Such mechanisms include, for example, a removable storage unit 222 adapted to exchange data through interface 220. Examples of such mechanisms include a program cartridge and cartridge interface, such as that found in video game devices, a removable memory chip, such as an EPROM, or PROM, and associated socket, and other removable units and interfaces which allow software and data to be transferred.

The DFE 200 includes a communications interface 224, which acts as both an input and an output to allow software and data to be transferred between the DFE 200 and external devices. Examples of a communications interface include a modem, a network interface, such as an Ethernet card, a communications port, a PCMCIA slot and card, etc.

Computer programs (also called computer control logic) may be stored in main memory 204 and/or secondary memory 212. Computer programs may also be received via a communications interface 224. Such computer programs, when executed, enable the computer system to perform the features and capabilities provided herein. Software and data transferred via the communications interface can be in the form of signals which may be, for example, electronic, electromagnetic, optical, or other signals capable of being received by a communications interface. These signals are provided to a communications interface via a communications path (i.e., channel) which carries signals and may be implemented using wire, cable, fiber optic, phone line, cellular link, RF, or other communications channels.

In many printing applications variable data fields are important parts of a document. Often these fields contain the document relevant information and often these fields also contain information that is desired to be protected. It is understood that these fields might either be user added fields or metadata fields or any other type of auxiliary information. It is also understood that the user or application might desire to protect additional document components. For the purpose of simplicity, we will restrict the description to the variable data fields without limiting the scope to said fields.

Part of the data generally stored in secondary memory 212 for access during DFE operation is a set of translation tables that convert an incoming color signal into a physical machine signal. In our case, this color signal can be expressed as a colorimetric value, usually three components as L*a*b*, RGB, XYZ, etc. into physical exposure signals for the four toners cyan, magenta, yellow and black. These tables are commonly created outside of the DFE and downloaded, but are optionally created inside the DFE in a so-called characterization step.

The data can alternatively be expressed as idealized CMYK data, for example as Fogra, SWOP or GRACoL CMYK, or the data can be expressed as device dependent Device CMYK data. It is understood that IR or UV Security elements are generally represented by device dependent data since the security elements need to directly address specific colorants and colorant mixtures on the target device. One of the features of common front ends is the ability for a user or system administrator to define the translation for idealized CMYK data streams and to override color space information inside the document.

In situations where more than one CMYK based color space is used as part of the document, a conflict can occur between different document components inside a single print job. For example, the user might know that part of the source document is described as generic device CMYK, but that the original target for a component in the document was a web offset device and thus that all generic CMYK would best be rendered as a SWOP CMYK. This might be the case, for example, when repurposing images from one document to another. In this case, a conflict will occur if the same document also incorporates security elements that are required to be understood as the actual physical control parameters of the target device.

It is understood that this conflict is common since many CMYK based workflows do not explicitly define the idealized CMYK space that is used, thus requiring the users/operator to select a specific CMYK assumption.

This disclosure provides methods and systems to solve current UV and IR Specialty Imaging limitations in any CMYK work flow such as SWOP and GracoL CMYK using a spot color table approach. First, the basic IR and UV-fluorescent Specialty Imaging color set is decomposed into 8 distinct colorant mixtures and subsequently this base colorant mixture set is loaded into the DFE spot color table as named spot colors. Second, the spot colors are grouped into spatial structures, embedded as PatternInks to create a repeat pattern or tile. It is understood that the inventive step is the creation of specific spatial structures based on the 8 distinct colorant mixtures that are used as tile or repeat pattern and that the page description language dependent implementation is an outcome of the actual language.

It is also important to realize that in the inventive methods multiple spatial structures based on the base distinct colorant mixtures will have the same visual or perceptual color. In essence, patterns are created from the 8 base spot colors so that multiple physically distinct patterns will result in the same visual perception. It is this physical ambiguity for the same perceptual result that is used as the base for the security marking through metameric rendering. These spatially structured colorant are thus defined by an externally accessible name without the need to externally directly access, calculate or modify the device specific colorant mixtures. Different devices can and do through their DFE replace identical names in the document description with device specific colorant mixtures and thus enable the metameric rendering to create distinguishable physical effects for matching visual perception patterns.

In current Specialty Imaging scenarios, all Specialty Imaging effects are created in device specific CMYK which is explicitly distinguished from a idealized CMYK. This is based on the need to directly address the individual separations inside the print engine. There is a serious disadvantage in this approach, since it requires the entire page to use device specific CMYK for its 4-component data and thus Specialty Imaging cannot be mixed with any SWOP, GRACoL or other idealized CMYK data, since those description would undergo a transformation into the physical device space. This can cause serious problems since customer data may be created in these color spaces, or might contain elements that were created in those color spaces in a repurposing scenario.

This disclosure describes methods and systems to circumvent DFE limitations and to address a mixed directCMYK and SWOP (etc.) CMYK on the same page. This is achieved through a spot color approach, where multiple primitive spot colors are grouped into more complex spot color spatial structures, and where each spot color has one of a few predetermined colorant mixtures.

In order to create Specialty Imaging Effects, it is important that the device is addressed directly, without any intermediate processing, such as re-scaling or color conversion. This is important to guarantee that the physical properties of a spatial pattern is maintained as distinct, specifically if the visual or perceptual properties are the same. For example, in order to create the correct InfraRed response, one needs to exactly define the different k components of the image rendering. Also, in order to get the correct UV response, one needs to exactly define the toner area coverage. For that reason, all Specialty Imaging data is defined as device specific CMYK. Notably, in a completely object oriented color rendering, no problem would exist, but in real world DFEs we encounter the limitation that only a limited number of color spaces can be placed onto a single page without the color data being in potential conflict with each other. In terms of work flow, this means that CMYK data can co-exist with rgb data, etc, but two different cmyk data types cannot co-exist. In other words, SWOP cmyk and GRACoL cmyk, for example, cannot be on the same page. Also, SWOP cmyk and DirectCMYK cannot be on the same page. Consequently, Specialty Imaging cannot be applied to any job that uses a four component color space as its source. Since four component color definitions are extremely common in graphics arts applications, this limits Specialty Imaging and Security because they cannot be added to any existing job.

Provided below are exemplary methods and systems to circumvent the above described problem by forming spatially patterned spot colors from spot color primitives and thereby avoiding any color space issue at the DFE.

One common way to specify special colors in PDLs is the use of spot color definitions. An example would be the Pantone® palette, where named colors are retrieved from an internally stored database/table. Notably, these tables can be large and consist of single color entries, meaning that the color is defined as a homogeneous, non varying structure. In essence, a constant value, read from memory. In contrast, most Specialty Imaging colors have a spatial structure and thus cannot be represented as a spot color, per se.

In order to circumvent this problem concatenated are two separate processes, the first one creating a small subset of basic spot colors and the second one assembling several of these spot colors into spatially structured Pattern Inks.

Figure 3:
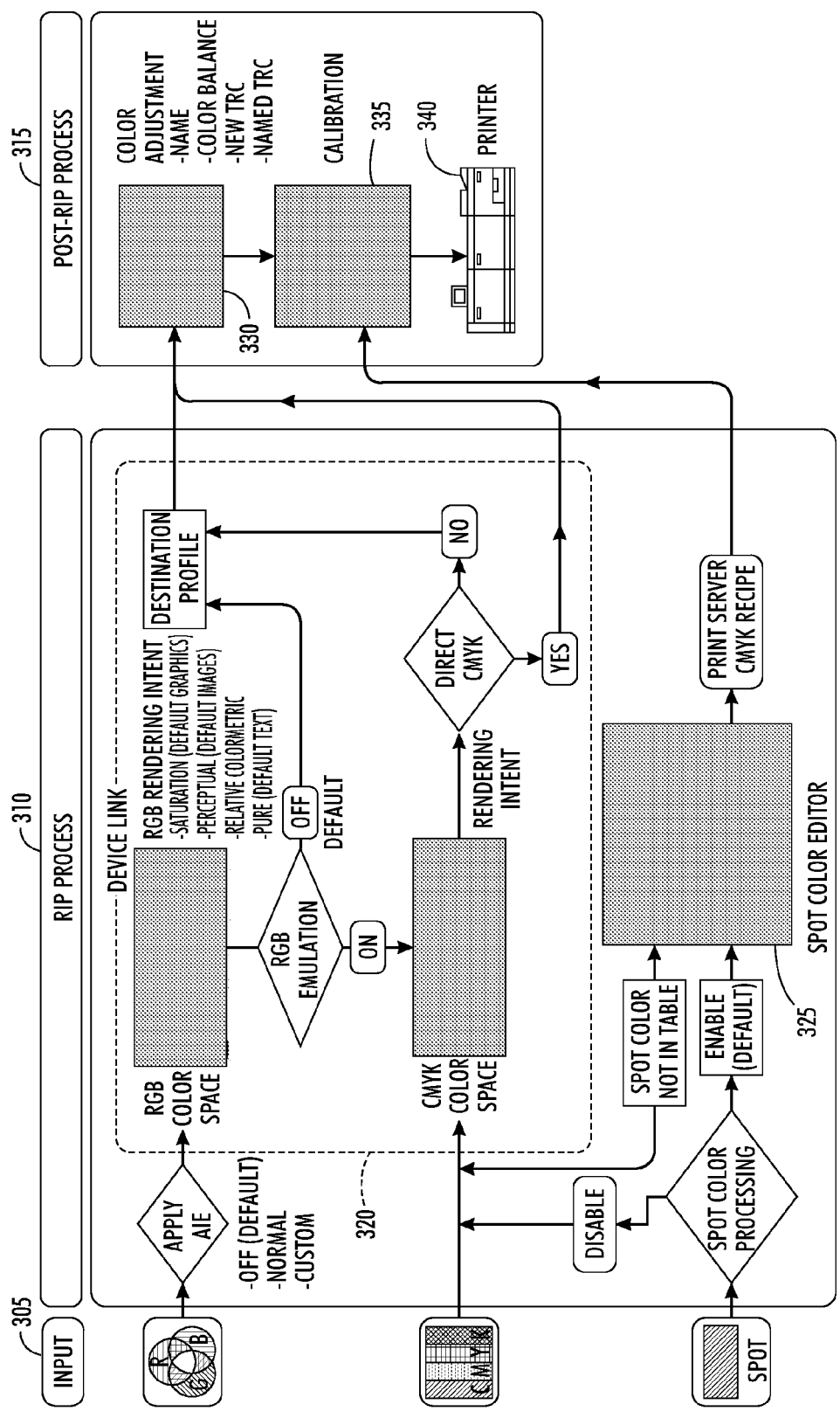
FIG. 3 is a print server work flow chart according to one exemplary embodiment of this disclosure.

With reference to FIG. 3, illustrated is a print server work flow according to an exemplary embodiment of this disclosure. FIG. 3 provides one example of work flow associated with a printing system utilizing a spot color approach to render UV and IR Specialty Imaging effects according to this disclosure. Notably, FIG. 3 provides an overview of the printing system work flow input 305. RIP Process 310 and Post-Rip Process 315 including a spot color process 325 providing the ability to generate UV and IR Specialty Imaging.

As can be seen in FIG. 3, the work flow input 305, i.e. print job, may include image data including RGB color space data, CMYK color space data and/or spot color data. In the event UV or IR Specialty Imaging is not specified for the print job, the RGB and CMYK input data is transformed to device dependent CMYK data via the DeviceLink 320, which may include processing of the image data utilizing a Destination Profile and/or providing Direct CMYK, i.e. device dependent CMYK data, to the Post-Rip Process 315.

As shown, processes associated with the DeviceLink 320 include RGB Rendering Intent and RGB emulation.

In the event a spot color is specified for a particular print job, a separate processing path is utilized to generate a CMYK recipe independent from the DeviceLink processing path. The spot color CMYK recipe is subsequently communicated to the Post-RIP Process Calibration 335 and Printer 340, by passing any Color Adjustment 330 processes used for non-spot color image data. This spot color processing path provides device dependent CMYK data which is not subject to manipulation by other printing system color modification processes and thereby better controls the color of the rendered individual spot color, relative to the DeviceLink process path which is designed for controlling a plurality of colors.

To provide individual control of one or more spot color CMYK recipes, a Spot Color Editor 325 is provided.

As will be further described below, the Spot Color Process/Editor provides a work flow process path to enable the inclusion of UV and IR Specialty Imaging.

Creating a Basic Spot Color Set

Figure 4:
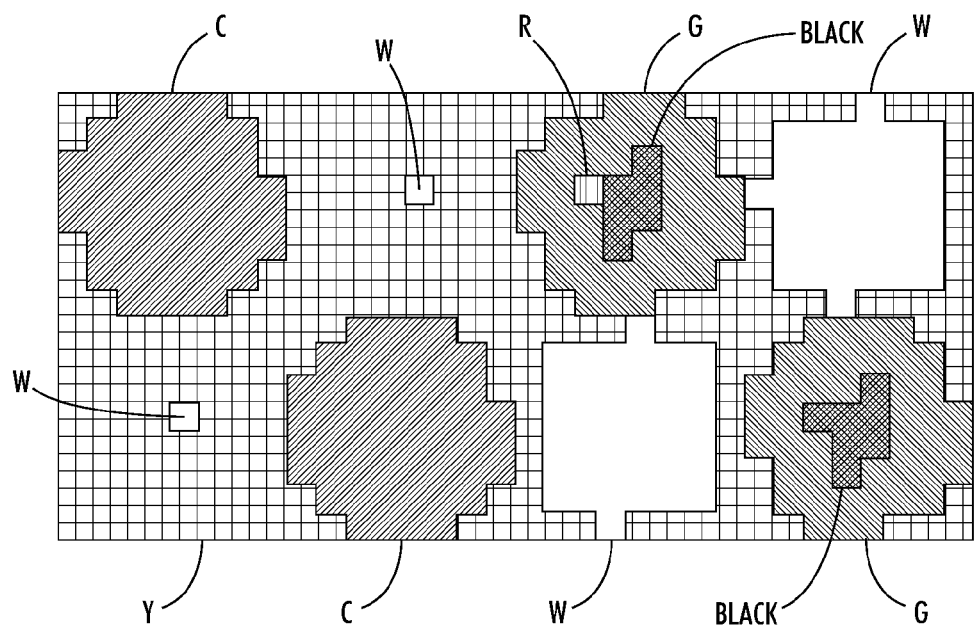
FIG. 4 shows a UV fluorescence Specialty Imaging spatial pattern according to an exemplary embodiment of this disclosure.
Figure 5:
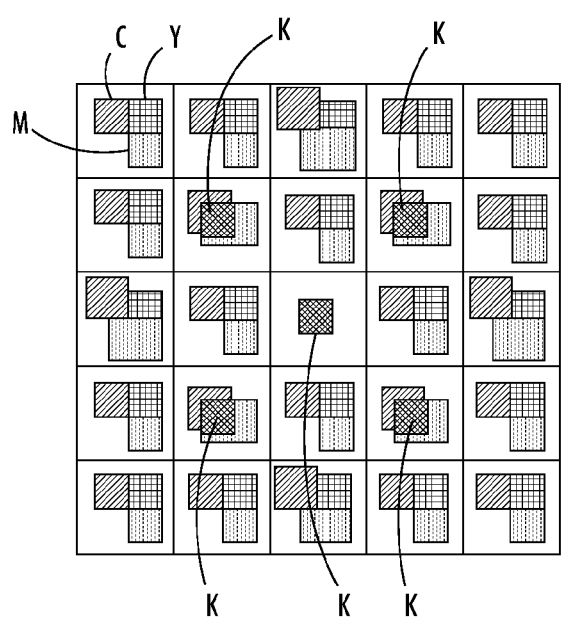
FIG. 5 shows an IR Specialty Imaging spatial pattern according to an exemplary embodiment of this disclosure.

When creating infrared and UV-fluorescent Specialty Imaging colors as described in U.S. Pat. No. 7,800,785, issued Sep. 21, 2010, entitled "METHODOLOGY FOR SUBSTRATE FLUORESCENT NON-OVERLAPPING DOT DESIGN PATTERNS FOR EMBEDDING INFORMATION IN PRINTED DOCUMENTS," by Bala et al.; U.S. patent application Ser. No. 11/758,344, filed Jun. 5, 2007, entitled "INFRARED ENCODING OF SECURITY ELEMENTS USING STANDARD XEROGRAPHIC MATERIALS," by Eschbach et al.; and U.S. patent application Ser. No. 12/627,163, filed Nov. 30, 2009, entitled "PHASE LOCKED IR ENCODING FOR PEENED 2D BARCODES," by Zhao et al., developed are metameric matches of two different colorant quadruplets, cmyk1 and cmyk2. In the case of infrared colors, one of the quadruplets has a high k component and the other one a low k component. In the case of UV fluorescence, one quadruplet has a high area coverage and one has a low area coverage. Despite the different boundary conditions, it can easily be seen that in both cases, a good solution for the UV/IR colors is given by spatial patterns of the form [k,r,g,b,c,m,y] where each component exists in its binary form (0|1). In essence, all Specialty Imaging colors look similar to the colors shown in FIGS. 4 and 5. FIG. 4 shows a UV fluorescence pair modulating the white space to create paper fluorescence and FIG. 5 shows an IR pair modulating the black (k) toner amount. In FIGS. 4 and 5 one has to understand that the visible impression of black could be generated by either a colorant mixture of cyan, magenta and yellow, or by the pure colorant k (black). For the fluorescence effect in FIG. 4 the area coverage has to be modulated in the metameric pair and thus the decision to render the black pixels in the center of the colored areas can be made based on other machine attributes since it does not influence the fluorescence response. In contrast, in FIG. 5, the black pixels in the centre of the colored areas have to be rendered by the K colorant in order to modulate the infrared response.

The result of the basic designs for UV and IR is that the named colors consist of a spatial pattern of simple colorant mixtures, where each colorant mixture contains either 0% or 100% of a given colorant and no intermediate values. This means that all Specialty Imaging colors can be decomposed into 8 distinct colorant mixtures (c,m,y,k,c+m,c+y,m+y,c+m+y), whereby cmy-black and k-black are considered distinct due to their distinct physical properties.

These 8 spot colors are loaded into the DFE spot color table as named colors. In one exemplary embodiment, the naming convention is dictated by the product implementation to be easily recognizable and to avoid name conflicts.

Creating Structured Spot Colors

If the above mentioned spot colors are loaded into the spot color table of the DFE, they circumvent the standard color conversions and they also co-exist with any other color space without cross transformation or interference. Now these spot colors are grouped into PatternInks (a PDL construct) and in that way create a tile or repeat pattern. The result is a color pattern identical to the ones shown in FIGS. 4 and 5. According to one exemplary embodiment for a UV color 206, the construct has the form of:

```
/PIX {.12 mul} def
/UV_DARKORANGE_206_B
<<
    /PatternType 1
    /PaintType 1
    /TilingType 1
    /BBox [0 0 64 1 PIX mul 64 1 PIX mul]
    /XStep 64 1 PIX mul
    /YStep 64 1 PIX mul
    /AlternateUV /UV_DARKORANGE_206_A
    /PaintProc
    {
      pop
      1 setgray % write white
      0 0 64 PIX 64 PIX rectfill
      [64 1 PIX mul 0 0 64 1 PIX mul 0 0] concat
      [/Separation (SI_C) [/DeviceCMYK] {dup 1.0 mul exch dup 0 mul
exch dup 0 mul exch 0 mul}] setcolorspace
        <<
          /ImageType 1
          /Width 64
          /Height 64
          /BitsPerComponent 1
          /Decode [ 1 0 ]
          /ImageMatrix [64 0 0 –64 0 64]
          /DataSource <~
Gar8O5QqcsBS-LtiWOf@'U!1GW;Z@r*rnjD'gV~>
          /FlateDecode filter
          /MultipleDataSources false
        >>
      imagemask
      [/Separation (SI_M) [/DeviceCMYK] {dup 0 mul exch dup 1.0 mul
exch dup 0 mul exch 0 mu1}] setcolorspace
        <<
          /ImageType 1
          /Width 64
          /Height 64
          /BitsPerComponent 1
          /Decode [ 1 0 ]
          /ImageMatrix [64 0 0 –64 0 64]
          /DataSource <~
Gau*KYQ;X&.!u5QLXG%$."nS+JO2<u-Lh?KM) 53
<ql'Jc[3#DFfU/?~>
          /FlateDecode filter
          /MultipleDataSources false
        >>
      imagemask
      [/Separation (SI_Y) [/DeviceCMYK] {dup 0 mul exch dup 0 mul
exch dup 1.0 mul exch 0 mul}] setco1orspace
        <<
          /ImageType 1
          /Width 64
          /Height 64
          /BitsPerComponent 1
          /Decode [ 1 0 ]
          /ImageMatrix [64 0 0 –64 0 64]
          /DataSource <~
Gapkns"G9J66RQfl>m[:FbcY%c61R9$FPrK:S@dhh`t!!~>
          /FlateDecode filter
          /MultipleDataSources false
        >>
      imagemask
    }
>>
matrix makepattern def
% End of definition of pattern ink UV_DARKORANGE_206_B
```

Figure 6:
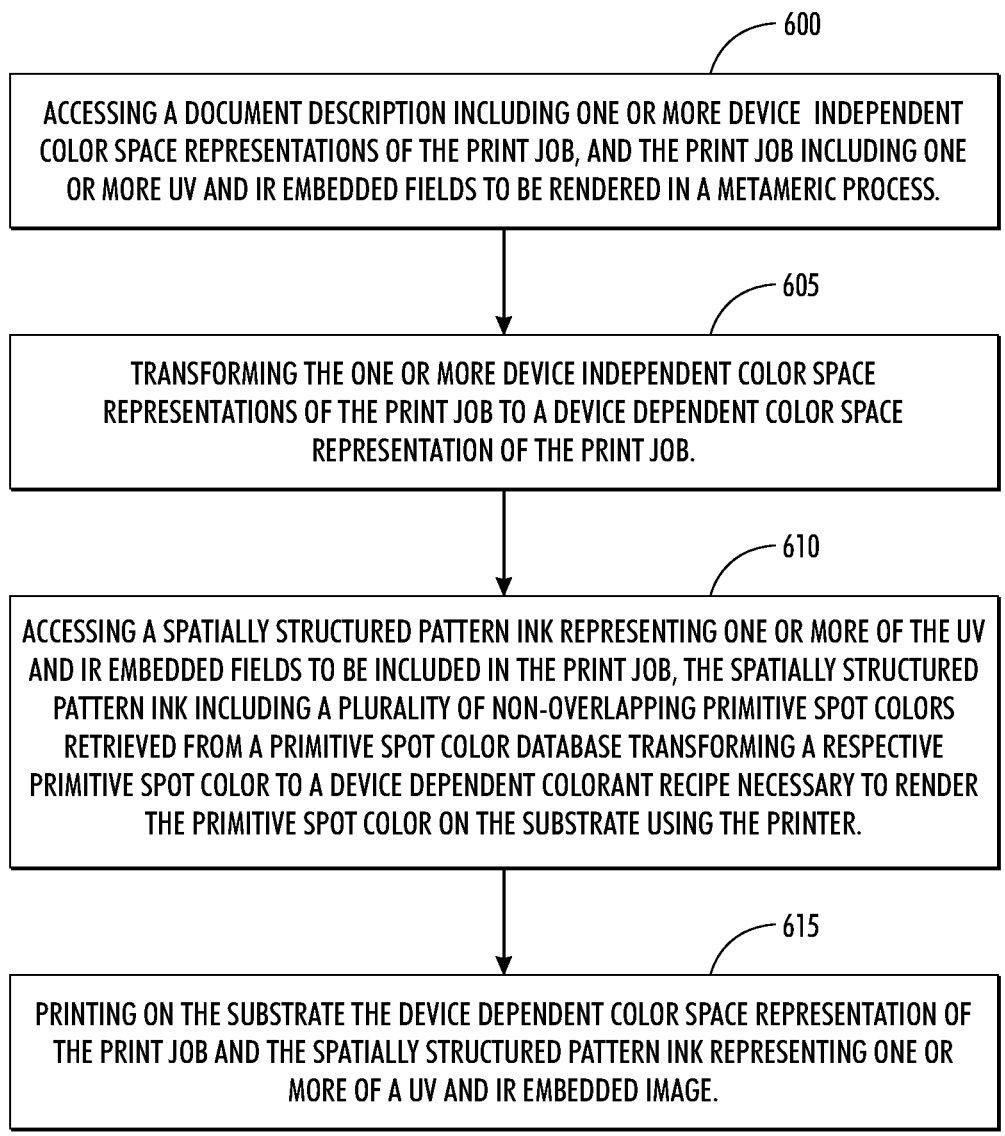
FIG. 6 shows an exemplary method of processing a print job including UV/IR Specialty Imaging according to this disclosure.

With reference to FIG. 6, illustrated is a flow chart of an exemplary method of processing a printing system work flow associated with a print job, the work flow including a UV/IR embedded image.

Initially 600, accessing a document description including one or more device independent color space representations of the print job, the print job including one or more UV and IR embedded fields to be rendered in a metameric process.

Next 605, transforming the one or more device independent color space representations of the print job to a device dependent color space representation of the print job.

Next 610, accessing a spatially structured pattern ink representing one or more of the UV and IR embedded fields to be included in the print job, the spatially structured pattern ink including a plurality of non-overlapping primitive spot colors retrieved from a primitive spot color database transforming a respective primitive spot color to a device dependent colorant recipe necessary to render the primitive spot color on the substrate using the printer.

Finally 615, the process prints on a substrate the device dependent color space representation of the print job and the spatially structured pattern ink representing the UV/IR embedded image.

Importantly, the printing of the device dependent color space representation on the substrate includes one or more halftone processes, and the printing of the spatially structured pattern ink on the substrate substantially includes the minimization of the effect of the one or more halftone processes on the printing of the spatially structured pattern ink by nature of the colorant mixture levels.

Other features of the method illustrated in FIG. 6 may include the following:

The method of FIG. 6, wherein the device independent color space is associated with a color specification, and the color specification is one or more of GRACoL, commercial CMYK, Europe ISO coated FOGRA 27 CMYK, Euroscale Coated CMYK, FOGRA*CMYK, ISO coated, ISO uncoated, Japan Color, SWOP coated CMYK, SWOP Plus CMYK, and US Sheet Fed coated CMYK.

The method of FIG. 6, wherein the device dependent color representation and the device dependent colorant recipe are one of CMY, CMYK, CMYKO, CMYKOG, CMYK lightC, CMYK lightC lightM, CMYKV.

The method of FIG. 6, wherein the spatially structured pattern ink includes a plurality of non-overlapping bit maps, each bit map associated with a respective primitive spot color.

The method of FIG. 6, wherein the printer includes C, M, Y and K colorants, and the primitive spot colors include C, M, Y, K, C+M (blue), C+Y (green), M+Y (red) and C+M+Y (process black).

The method of FIG. 6, wherein the spatially structured pattern ink includes two distinct patterns to create a UV fluorescent embedded image.

The method of FIG. 6, wherein the spatially structured pattern ink includes two distinct patterns to create an IR embedded image.

The method of FIG. 6, wherein the primitive spot colors include primary and secondary colors associated with the printer.

It should be understood that terms such as computer program medium, computer executable medium, computer usable medium, and computer readable medium, are used herein to generally refer to media such as main memory and secondary memory, removable storage drive, a hard disk installed in a disk drive, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, which allows a computer to read such computer readable information.

It should also be understood that the methods described in the flowcharts provided herewith can be implemented on the DFE, a special purpose computer, a microprocessor or microcontroller, an ASIC or other integrated circuit, a DSP, an electronic circuit such as a discrete element circuit, a programmable device such as a PLD, PLA, FPGA, PAL, PDA, and the like. In general, any device or system capable of implementing a finite state machine that is in turn capable of implementing one or more elements of the flow diagrams provided herewith, or portions thereof, can be used. It is also understood that all or parts of the DFE functionality might be separated across different physical machines or different virtual machines that are a part of a dynamic service. Portions of the flow diagrams may also be implemented partially or fully in hardware in conjunction with machine executable instructions.

Furthermore, the flow diagrams hereof may be partially or fully implemented in software using procedural or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof may be readily implemented as software executed on a programmed general purpose computer, a special purpose computer, and/or a microprocessor. In this case, the methods hereof can be implemented as a routine embedded on a personal computer or as a resource residing on a server or workstation, such as a routine embedded in a plug-in, a photocopier, a driver, a scanner, a photographic system, and/or a xerographic device. The methods provided herein can also be implemented by physical incorporation into an image processing or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein.

Furthermore, the article of manufacture may be included on at least one storage device readable by machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of processing a document printing system work flow associated with a print job and printing the print job on a substrate using a printer operatively connected to the work flow, the work flow including one or more of a UV and IR embedded image, the method comprising:
   a) accessing a document description including one or more device independent color space representations of the print job, the print job including one or more UV and IR embedded fields to be rendered in a metameric process associated with a spot color process;
   b) transforming the one or more device independent color space representations of the print job not associated with the one or more of the UV and IR embedded fields to a device dependent color space representation using a color management process independent of the spot color process;
   c) accessing a spatially structured pattern ink from a plurality of spatially structured pattern inks associated with one or more of the UV and IR embedded fields to be included in the print job, the spatially structured pattern ink including a plurality of non-overlapping primitive spot colors retrieved from a primitive spot color database associated with the spot color process transforming a respective primitive spot color to a device dependent colorant recipe necessary to render the primitive spot color on the substrate using the printer;
   d) printing on the substrate the device dependent color space representation of the print job associated with the color management process independent of the spot color process and the spatially structured pattern ink associated with one or more of a UV and IR embedded image,
   wherein the printing of the device dependent color space representation of the print job associated with the color management process independent of the spot color process on the substrate includes one or more halftone processes, the printing of the spatially structured pattern ink on the substrate substantially includes the minimization of the effect of the one or more halftone processes on the printing of the spatially structured pattern ink, and the primitive spot colors include primary and secondary colors associated with the printer.

2. The method according to claim 1, wherein the device independent color space is associated with a color specification, and the color specification is one or more of GRACoL, commercial CMYK, Europe ISO coated FOGRA 27 CMYK, Euroscale Coated CMYK, FOGRA*CMYK, ISO coated, ISO uncoated, Japan Color, SWOP coated CMYK, SWOP Plus CMYK, and US Sheet Fed coated CMYK.

3. The method according to claim 1, wherein the device dependent color representation and the device dependent colorant recipe are one of CMY, CMYK, CMYKO, CMYKOG, CMYK lightC, CMYK lightC lightM, CMYKV.

4. The method according to claim 1, wherein the spatially structured pattern ink includes a plurality of non-overlapping bit maps, each bit map associated with a respective primitive spot color.

5. The method according to claim 1, wherein the printer includes C, M, Y and K colorants, and the primitive spot colors include C, M, Y, K, C+M (blue), C+Y (green), M+Y (red) and C+M+Y (process black).

6. The method according to claim 1, wherein the spatially structured pattern ink includes two distinct patterns to create a UV fluorescent embedded image.

7. The method according to claim 1, wherein the spatially structured pattern ink includes two distinct patterns to create an IR embedded image.

8. A document printing system comprising:
   a printer configured to receive device dependent data representative of a print job and print the device dependent data representation on a substrate, and
   a controller operatively connected to the printer, the controller configured to execute controller readable instructions to perform a method of processing a printing system work flow associated with a print job and printing the print job on the printer, the work flow including one or more of a UV and IR embedded image, the method comprising:
   a) accessing a document description including one or more device independent color space representations of the print job, the print job including one or more UV and IR embedded fields to be rendered in a metameric process associated with a spot color process;
   b) transforming the one or more device independent color space representations of the print job not associated with the one or more of the UV and IR embedded fields to a device dependent color space representation using a color management process independent of the spot color process;
   c) accessing a spatially structured pattern ink from a plurality of spatially structured pattern inks associated with one or more of the UV and IR embedded fields to be included in the print job, the spatially structured pattern ink including a plurality of non-overlapping primitive spot colors retrieved from a primitive spot color database associated with the spot color process transforming a respective primitive spot color to a device dependent colorant recipe necessary to render the primitive spot color on the substrate using the printer;
   d) printing on the substrate the device dependent color space representation of the print job associated with the color management process independent of the spot color process and the spatially structured pattern ink associated with one or more of a UV and IR embedded image,
   wherein the printing of the device dependent color space representation of the print job associated with the color management process independent of the spot color process on the substrate includes one or more halftone processes, the printing of the spatially structured pattern ink on the substrate substantially includes the minimization of the effect of the one or more halftone processes on the printing of the spatially structured pattern ink, and the primitive spot colors include primary and secondary colors associated with the printer.

9. The document printing system according to claim 8, wherein the device independent color space is associated with a color specification, and the color specification is one or more of GRACoL, commercial CMYK, Europe ISO coated FOGRA 27 CMYK, Euroscale Coated CMYK, FOGRA*CMYK, ISO coated, ISO uncoated, Japan Color, SWOP coated CMYK, SWOP Plus CMYK, and US Sheet Fed coated CMYK.

10. The document printing system according to claim 8, wherein the device dependent color space representation and the device dependent colorant recipe are one of CMY, CMYK, CMYKO, CMYKV.

11. The document printing system according to claim 8, wherein the spatially structured pattern ink includes a plurality of non-overlapping bit maps, each bit map associated with a respective primitive spot color.

12. The document printing system according to claim 8, wherein the printer includes C, M, Y and K colorants, and the primitive spot colors include C, M, Y, K, C+M (blue), C+Y (green), M+Y (red) and C+M+Y (process black).

13. The document printing system according to claim 8, wherein the spatially structured pattern ink includes two distinct patterns to create a UV fluorescent embedded image.

14. The document printing system according to claim 8, wherein the spatially structured pattern ink includes two distinct patterns to create an IR embedded image.

15. A non-transitory computer program product storing computer readable instructions, that when executed by a printing system controller, cause the printing system controller to execute a method of processing a document printing system work flow associated with a print job and printing the print job on a substrate using a printer operatively connected to the work flow, the work flow including one or more of a UV and IR embedded image, the method comprising:
   a) accessing a document description including one or more device independent color space representations of the print job, the print job including one or more UV and IR embedded fields to be rendered in a metameric process associated with a spot color process;
   b) transforming the one or more device independent color space representations of the print job not associated with the one or more of the UV and IR embedded fields to a device dependent color space representation using a color management process independent of the spot color process;
   c) accessing a spatially structured pattern ink from a plurality of spatially structured pattern inks associated with one or more of the UV and IR embedded fields to be included in the print job, the spatially structured pattern ink including a plurality of non-overlapping primitive spot colors retrieved from a primitive spot color database associated with the spot color process transforming a respective primitive spot color to a device dependent colorant recipe necessary to render the primitive spot color on the substrate using the printer;
   d) printing on the substrate the device dependent color space representation of the print job associated with the color management process independent of the spot color process and the spatially structured pattern ink associated with one or more of a UV and IR embedded image,
   wherein the printing of the device dependent color space representation of the print job associated with the color management process independent of the spot color process on the substrate includes one or more halftone processes, the printing of the spatially structured pattern ink on the substrate substantially includes the minimization of the effect of the one or more halftone processes on the printing of the spatially structured pattern ink, and the primitive spot colors include primary and secondary colors associated with the printer.

16. The computer program product according to claim 15, wherein the device independent color space is associated with a color specification, and the color specification is one or more of GRACoL, commercial CMYK, Europe ISO coated FOGRA 27 CMYK, Euroscale Coated CMYK, FOGRA*CMYK, ISO coated, ISO uncoated, Japan Color, SWOP coated CMYK, SWOP Plus CMYK, and US Sheet Fed coated CMYK.

17. The computer program product according to claim 15, wherein the device dependent color space representation and the device dependent colorant recipe are one of CMY, CMYK, CMYKO, CMYKV.

18. The computer program product according to claim 15, wherein the spatially structured pattern ink includes a plurality of non-overlapping bit maps, each bit map associated with a respective primitive spot color.

19. The computer program product according to claim 15, wherein the printer includes C, M, Y and K colorants, and the primitive spot colors include C, M, Y, K, C+M (blue), C+Y (green), M+Y (red) and C+M+Y (process black).

20. The computer program product according to claim 15, wherein the spatially structured pattern ink includes two distinct patterns to create a UV fluorescent embedded image.

21. The computer program product according to claim 15, wherein the spatially structured pattern ink includes two distinct patterns to create an IR embedded image.

* * * * *